United States Patent Office
3,600,296
Patented Aug. 17, 1971

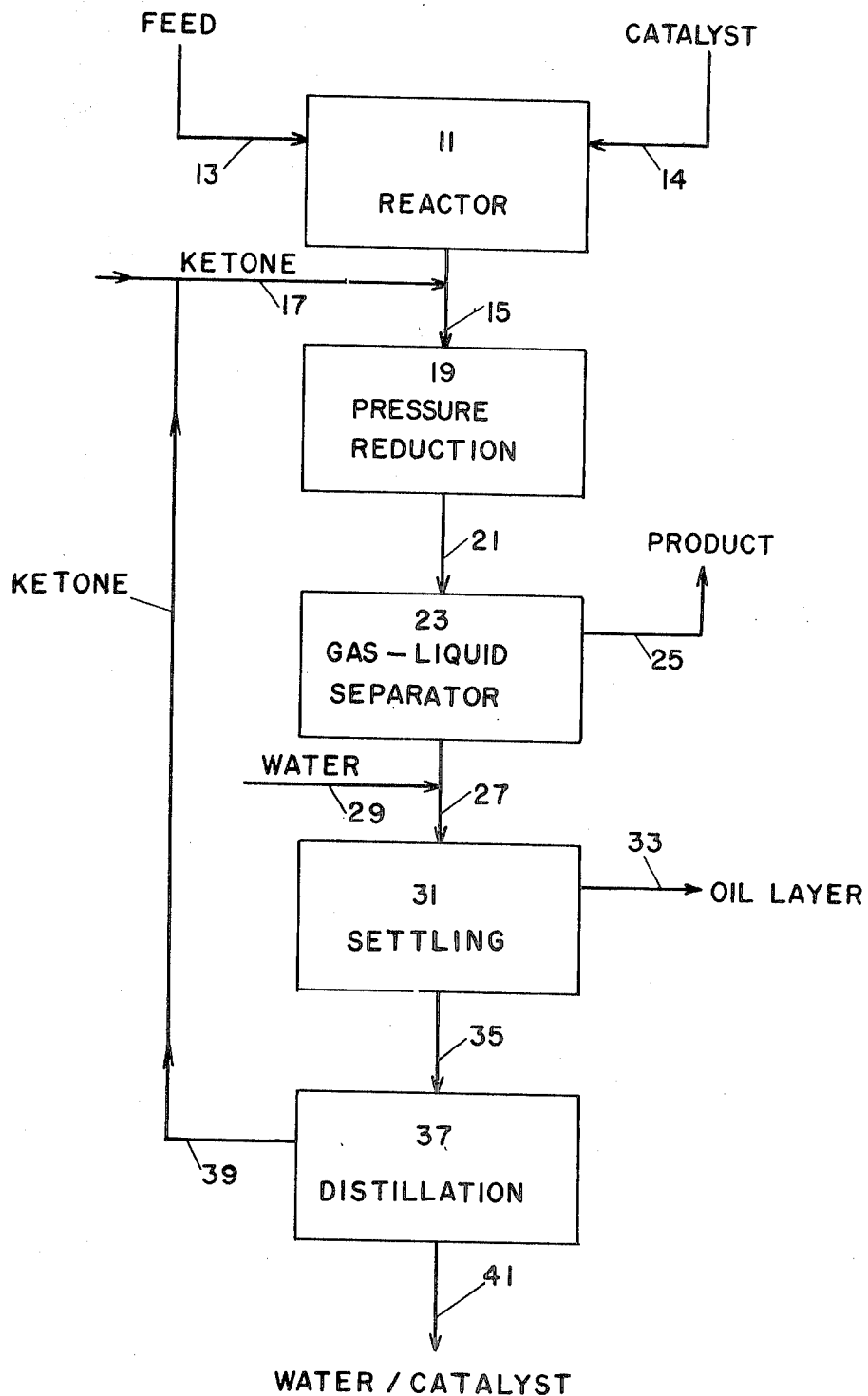

3,600,296
CONTINUOUS RECOVERY OF HYDROCARBON PRODUCT FROM EFFLUENT CONTAINING FRIEDEL-CRAFTS CATALYST THEREIN
Robert W. Rieve, Springfield, Pa., assignor to Atlantic Richfield Company, New York, N.Y.
Filed July 22, 1969, Ser. No. 843,469
Int. Cl. C10g *21/16;* C07c *7/00*
U.S. Cl. 208—13                    5 Claims

ABSTRACT OF THE DISCLOSURE

A process for the elimination of sludges and complexes that form when Friedel-Crafts catalysts are used in hydrocarbon reactions said process including the addition of acetone, diacetyl, or methylethylketone to the reactor effluent as the effluent leaves the reaction vessel thereby dissolving the sludges and complexes as formed, and preventing any undesired accumulation of said sludges and complexes from fouling the reaction facilities, and preventing losses of catalyst and hydrocarbon which ordinarily become bound up in said sludges and complexes.

---

Metallic halides of the Friedel Crafts class such as the bromides and chlorides of zinc, aluminum, iron, boron and titanium are used as a catalyst in many reactions involving hydrocarbons including isomerization, polymerization, alkylation and acetylation. Aluminum chloride, being relatively inexpensive and having superior activity is one of the most widely used of these catalysts. These hydrocarbon conversion processes have the disadvantage of forming various complexes or sludges which may be suspended in finely divided form in the reaction mixture, or carried through the product stream as a fluid, metallic halide-enriched sludge, or deposited as a solid. This unavoidable formation of complexes within the reaction zone or in the conduits downstream therefrom has been an inherent and often troublesome drawback in hydrocarbon conversion processes. While the exact chemical makeup of the sludge is not well defined, it is known to be a complex comprising catalyst in combination with the feed and product of the reaction. Regardless of the reaction controls imposed, a substantial amount of the complex is formed. Major processing difficulties are caused by transporting and depositing the sludge throughout various processing facilities including reaction vessels and equipment downstream of the reaction zone, eventually resulting in the fouling of said processing facilities.

Furthermore, the sludge seems to form with the metallic halide catalyst as a nucleus and as the catalyst become completely coated, it loses its catalytic capability. The hydrocarbon portion of the sludge undergoes extensive acid catalyzed reactions until it no longer resembles feed or product. These losses of catalyst and hydrocarbon have placed these processes at an economic disadvantage.

In the past the precipitated sludges and some of the dispersed sludges have been removed by filtering, centrifuging and/or settling, and some of the precipitating sludges have been removed by hydrolysis, clay treatment, and solvent extraction. These methods do not satisfactorily remove many of the non-settling sludges which are present.

Methods have also been developed whereby various detergents are used to remove the sludges which accumulate on the internal walls of the process facilities, however, utilization of these detergents requires a production shutdown and a consequent loss of time.

Although the above sludge removal methods have had some limited success in maintaining the reaction equipment in operating condition, they have not provided any means for recovering the catalyst and/or hydrocarbons that are in the sludge.

Accordingly, it is an object of this invention to provide a method for continuously removing metallic halide sludges and complexes from the product stream of a hydrocarbon reaction using a Friedel Crafts catalyst whereby said process facilities do not become fouled by the presence of the metal halide complexes.

It is a further object of the instant invention to remove entrained and dissolved metallic halide catalyst from the hydrocarbon effluent leaving a hydrocarbon conversion zone.

Another object of the present invention is to recover and recycle the unreacted hydrocarbon from the product stream of a hydrocarbon reaction when Friedel Crafts catalysts are used.

I have discovered that these and other objects of this invention can be accomplished by adding a solvent to the reactor effluent immediately after the reaction zone in order to return said effluent to an all liquid phase. In order to be effective it is important that the solvent used in this process have the following characteristics:

(1) It must boil below the boiling point of water so that it can be easily recovered.

(2) It must be appreciably soluble in water so that it can be washed out of the product with little or no loss, thereby leaving an uncontaminated product.

(3) It should be one that is inert with respect to the feed and the product.

(4) It must be one that will break up the metal halide-hydrocarbon complex and itself form a complex with said metal halide.

I have found that low molecular weight ketones such as acetone, diacetyl, and methylethylketone can be used effectively.

The solvent should be injected into the reactor effluent at a temperature not above 100° C. This temperature limit prevents the solvent from forming a catalytically active complex with the metal halide thereby quenching catalytic activity and placing the sludge in solution. The ketone should be added in a concentration such that it represents from 2 to 500 moles and preferably 100 to 200 moles of ketone per mole of metal halide in the reactor effluent. The amount should be controlled so that an optimum mixture of product/ketone/catalyst sludge results. An insufficient amount of the solvent will not completely dissolve all of the sludge that is present while an exceedingly excessive amount will require more recovery time, although it is not harmful per se. When acetone is used as the solvent and aluminum chloride is used as the catalyst I prefer to add 100 to 200 moles of acetone per mole of aluminum chloride in the effluent.

The present invention can best be described with reference to the attached schematic flow diagram which is exemplary of the general features of the process. It is not intended to be limiting upon the broad scope of the invention. For simplicity aluminum chloride will be used as the Friedel Crafts catalyst and acetone as the solvent, however such use is not intended to restrict the breadth of the invention as any of the before mentioned catalysts and/or solvents are also included within the scope of the disclosure.

The feed, which can be any hydrocarbon that effectively utilizes metal halides as reaction catalysts, enters the reactor 11, through line 13, and is reacted in the presence of an aluminum chloride catalyst which enter the reactor through line 14. It is during this reaction that the undesired aluminum chloride-hydrocarbon sludges are formed.

As the product and sludge mixture leave the reactor through line 15, acetone is injected into the stream through line 17. The acetone is introduced in such quantities as to insure that all of the sludge formed in the reactor will be placed in solution. An excess of acetone is not harmful as the acetone is subsequently recovered, as will be explained later. The solution then passes through a pressure reduction system 19, wherein it is reduced to atmospheric pressure. As the solution leaves the pressure reduction system through line 21, it passes into a gas-liquid separator 23, wherein the desired gaseous product is taken from the stream through line 25. The liquid solution passes through line 27 wherein water is injected into the system through line 29. Adding the water after the pressure reduction prevents any water vapor from getting into the reactor. The addition of water causes an oil layer containing the sludge and complex to separate from the solution in the settling tank 31. This oil layer is led off through line 33 and the water, acetone, and dissolved aluminum chloride solution is transferred through line 35 to a distillation tower 37, wherein the acetone is recovered and passed through line 39 to be utilized once again. The water-aluminum chloride solution passes through line 41 and the aluminum chloride can be recovered from the water.

EXAMPLE 1

Catalytically cracked furnace oil was charged to a continuous flow unit using aluminum chloride as the catalyst using a furnace oil feed rate of 65.0 ccs. per hour and an aluminum chloride addition rate of 0.34 gram per hour. The reactor temperature was held at 500° F. and the pressure maintained at 2000 p.s.i.g. with hydrogen gas. Anhydrous acetone was continuously injected into the reactor effluent in an amount equal to 193 moles of acetone per mole of aluminum chloride in the effluent. At the end of 22 hours there was no sludge buildup in the effluent lines and the product stream was a single phase solution.

EXAMPLE 2

An experiment similar to Example 1 was carried out however no acetone was injected into the reactor effluent. After three hours on stream there was a heavy sludge deposit in the effluent product lines.

EXAMPLE 3

The sludge from an experiment as in Example 2 was taken from the equipment lines with acetone periodically during an experimental run. This sludge-acetone solution was collected and contained only a trace of fine solids. When treated with water a hydrocarbon layer immediately separated. The hydrocarbon layer was a clear amber color, the same as the feed and had an API gravity at 60° F. of 23.8° as compared to 24.0° for the feed. Thus, it was shown that the oil recovered from the sludge in this manner very soon after its formation, was similar to the unconverted feed and could serve as a recycle feed stream.

The water layer remained clear and contained an aluminum chloride water complex which could be separated by conventional means.

I claim:
1. A process for recovering hydrocarbon product on a continuous basis from a reactor effluent stream containing said product and a Friedel Crafts catalyst complexed therewith which process comprises the steps of:
(1) injecting acetone into said effluent stream in an amount sufficient to place the catalyst-hydrocarbon complex in solution with said acetone wherein the acetone selectively complexes with the catalyst while maintaining a single phase effluent stream,
(2) reducing the pressure on the effluent from step (1) in order to form a two phase effluent comprising gases including unreacted starting materials and a liquid phase including hydrocarbon product and the acetone-Friedel Crafts catalyst,
(3) separating the gases of the effluent from step (2) by passing the effluent through a gas-liquid separator,
(4) introducing water into the liquid effluent from step (3) which causes an oil product layer to separate from an acetone-Friedel Crafts catalyst-water layer, and
(5) collection of the oil product layer through decantation from the acetone-Friedel Crafts catalyst-water layer of step (4);
whereby the reaction process equipment downstream from the reactor is maintained free of any Friedel Crafts complex accumulations.
2. The process of claim 1 wherein 2 to 500 moles of acetone per mole of catalyst in the reactor effluent are injected into said effluent.
3. The process of claim 2 wherein 100 to 200 moles of acetone per mole of catalyst in the reactor effluent are injected into said effluent.
4. The process of claim 1 wherein aluminum chloride is the catalyst, and wherein 100 to 200 moles of acetone per mole of aluminum chloride in the reactor effluent are injected into said effluent.
5. The process of claim 1 wherein the acetone-Friedel Crafts catalyst-water solution is fractionally distilled in order to recover the acetone for recycle.

References Cited
UNITED STATES PATENTS 3,342,885   9/1967   Hutson _____ 208—13X CURTIS R. DAVIS, Primary Examiner U.S. Cl. X.R.

260—674, 676